Patented Dec. 7, 1943

2,336,210

UNITED STATES PATENT OFFICE 2,336,210

4-4' DERIVATIVES OF 2-CARBOXYDIPHENYLSULPHONES AND ESTERS

George W. Anderson, Stamford, Conn., assignor to American Cyanamid Company, New York, N. Y., a corporation of Maine No Drawing. Application February 11, 1941,
Serial No. 378,416

3 Claims. (Cl. 260—397.6)

This invention relates to a new class of chemical compounds and methods for their preparation. More particularly it relates to 4,4'-derivatives of 2-carboxydiphenylsulphones. This new class of chemical compounds are those represented by the following general formula:

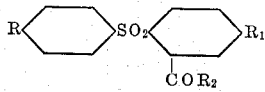

in which R represents an amino or acylamino radical, $R_1$ is a nitro or amino radical, and $R_2$ is a hydroxy, alkoxy, or amino radical. The invention also includes various derivatives of the above compounds, such as the sodium formaldehyde sulphoxylate derivatives and those of the Schiff base type, as well as salts thereof, especially the alkali metal salts of the compounds when $R_2$ is a hydroxy radical.

These compounds are useful as intermediates for the production of azo dyes and pharmaceuticals. Some of the compounds may be useful as chemotherapeutic agents, themselves, inasmuch as the carboxy group increases the solubility and at the same time may reduce the toxicity, since it has been known in the past that some sulphones possess therapeutic activity but are also toxic.

The methods for preparation of the compounds of this invention will be specifically illustrated in the following examples. It should be understood, however, that the examples are merely illustrative of the preferred method of preparing representative compounds of the class and they are not intended to limit the scope of the invention.

The parts are by weight except in the case of liquids which are expressed in corresponding parts by volume.

EXAMPLE 1

*Ethyl 2-acetylsulphanilyl-5-nitrobenzoate*

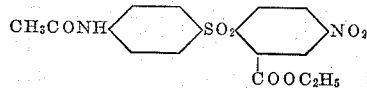

Thirty-nine parts of ethyl 2-chloro-5-nitrobenzoate (prepared by the method of Rupe, Ber., 30, 1099 (1897)) are refluxed with 47 parts of potassium p-acetylaminobenzene sulphinate in 140 parts of absolute ethyl alcohol for two hours in the presence of small amounts of copper powder and iodine. The resulting mixture is diluted with 200 parts of water and made alkaline with a dilute sodium hydroxide solution. The yellow crystalline product is filtered off and recrystallized from dilute alcohol. It has a melting point of about 157°–158° C.

In the above example the p-acetylaminobenzene sulphinate can be replaced by other p-acylaminobenzene sulphinates, such as p-butyryl, p-benzoyl, p-nicotinyl, p-valeryl, p-caproyl aminobenzene sulphinate and the like, to give a number of related compounds. The acetyl compound is generally employed if the product is to be ultimately subjected to a hydrolysis step to convert the acylamino group to an amino group since the acetylated compounds are more readily available and hence they are the cheapest. However, in other cases where the acylated sulphanilyl compound is to be used as such and is not to be subjected to a hydrolysis step in subsequent reactions, it may be desirable to use some other acylated compound as the reactant in place of the p-acetylaminobenzene sulphinate, the selection depending upon the particular use to which the product is to be put.

The process of Example 1 was carried out using the potassium sulphinate and in an ethyl alcohol medium. It is possible, however, to replace this medium with other suitable media, such as for example propyl, isopropyl alcohol, or other suitable alcohol, or organic liquids such as pyridine or dioxane may be employed. Similarly, sodium sulphinates may be used instead of the potassium sulphinates if so desired.

The invention, moreover, is not limited to the use of ethyl 2-chloro-5-nitrobenzoate, and nitrobenzoates in which other halogen groups are present instead of chloro, such as the fluoro and bromo, may be used. A halogen halide is split off as a by-product in the reaction, and it is not generally considered worthwhile to use such other halogen-substituted compounds since the chloro is the cheapest and the most readily available.

Similarly the ethyl-2-chloro-5-nitrobenzoate may be replaced by other esters, for example any aliphatic alcohol ester of 2-chloro-5-nitrobenzoic acid such as a methyl, propyl, isopropyl, butyl, N-butyl, octyl, of cycloaliphatic, such as the cyclohexyl, may be used.

EXAMPLE 2

*Ethyl-2-acetylsulphanilyl-5-aminobenzoate*

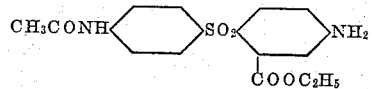

Twenty-one parts of the nitro compound from Example 1 are added to a hot mixture of 60 parts of 5% acetic acid and 34 parts of iron dust. The mixture is then heated on the steam bath for 2½ hours with occasional stirring and addition of water, after which it is neutralized with sodium carbonate, evaporated almost to dryness, and extracted with 225 parts of absolute alcohol in four portions. The alcohol extracts are diluted with 450 parts of hot water, treated with decolorizing carbon, and chilled. The crystalline precipitate is filtered off and recrystallized from dilute alcohol. It has a melting point of about 177°–178° C. with preliminary softening of 100° C.

The amino derivative of the nitro compound described in Example 1 is readily produced by the reduction process employed in Example 2. However, it is not intended to limit the invention to this particular method of reduction and other procedures, such as those employing hydrochloric acid and zinc may be employed.

By substituting the various alkyl 2-acylsulphanilyl-5-nitrobenzoates mentioned heretofore in the specification for the ethyl-2-acetyl compound used in Example 2, the corresponding amino derivatives can be obtained.

EXAMPLE 3

*Ethyl-2-sulphanilyl-5-aminobenzoate*

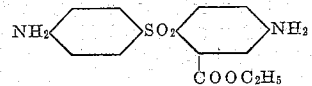

Sixteen parts of the acetylamino compound from Example 2 are refluxed for 15 minutes with 50 parts of concentrated hydrochloric acid plus 100 parts of water. The clear solution resulting is chilled and made alkaline with a sodium hydroxide solution. The product which precipitates is recrystallized from dilute alcohol, using decolorizing carbon. It has a melting point of about 182°–183° C.

The ethyl-2-acetylsulphanilyl-5-aminobenzoate in the above example may be replaced by the various alkoxy-2-acylsulphanilyl-5-aminobenzoates mentioned heretofore in the specification.

The amino compounds produced in accordance with Example 3 may be diazotized and coupled with known coupling reagents to produce valuable azo dyes. Similarly the compounds may be employed for the preparation of the Schiff base type of compounds.

EXAMPLE 4

*2-sulphanilyl-5-aminobenzoic acid*

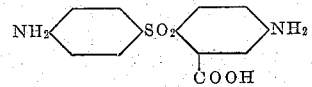

Seven parts of the ester from Example 3 are refluxed with 5 parts of sodium hydroxide in 50 parts of ethyl alcohol for half an hour. The product is cooled, diluted with 10 parts of water, and then neutralized to maximum precipitation with concentrated hydrochloric acid. The gummy precipitate is removed and recrystallized from absolute alcohol. It crystallizes as white needles containing one and a half mols of alcohol of crystallization per mol of the acid, having a melting point of about 108°–113° C. with decomposition.

The ethyl ester was used in the above example. It should be understood, however, that any other ester may be employed for carrying out the reaction. The ethyl ester, however, is preferred because of its cheapness and availability.

The compounds of the general formula in which $R_2$ is an amino radical are readily produced by reacting the corresponding carbalkoxy compound with ammonia or an amine.

The alkali metal salts of the carboxy compounds may also be prepared by reacting with sodium hydroxide or potassium hydroxide. For example, the sodium salt is prepared by adding 2-sulphanilyl-5-aminobenzoic acid to the equivalent amount of sodium hydroxide dissolved in a very small volume of water. The mixture is warmed on a steam bath until solution is complete. Absolute alcohol and ether are then added and the sodium salt is precipitated as a white crystalline product. It is readily soluble in water.

Other alkali metal salts can be prepared in a similar manner by using the appropriate alkaline hydroxide.

The copper salt of 2-sulphanilyl-5-aminobenzoic acid is prepared by adding slowly with stirring an aqueous solution of the sodium salt of 2-sulphanilyl-5-aminobenzoic acid to a solution containing an equivalent amount of copper chloride. The copper salt of 2-sulphanilyl-5-aminobenzoic acid separates as a solid.

Salts of other heavy metals, as for example, the gold, lead and iron salts are formed by reacting the sodium salt of 2-sulphanilyl-5-aminobenzoic acid in aqueous solution with a suitable soluble salt of the metal desired. The desired product is obtained usually as a precipitate.

The above description and examples are intended to be illustrative only. Any modification of or variation therefrom which conforms with the spirit of the invention is intended to be included in the scope of the claims.

What I claim is:

1. The compound of the formula:

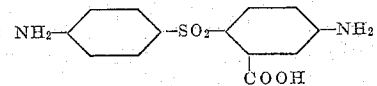

2. The process of preparing 2-sulphanilyl-5-aminobenzoic acid which comprises the steps of reacting a p-acylamino benzene sulphinate (wherein acyl refers to the acyl radical of a monocarboxylic acid) with an alkyl-2-halo-5-nitrobenzoate to produce an alkyl-2-acyl-sulphanilyl-5-nitrobenzoate, converting the nitro group to an amino group by reduction to produce an alkyl-2-acyl sulphanilyl-5-aminobenzoate, converting the acylamino group to an amino group to produce alky-2-sulphanilyl-5-aminobenzoate and hydrolyzing this compound to give 2-sulphanilyl-5-aminobenzoic acid.

3. In a process of producing 2-sulphanilyl-5-aminobenzoic acid the steps which comprise reacting ethyl-2-chloro-5-nitrobenzoate with potassium-p-acetylaminobenzene sulphinate to produce ethyl-2-acetylsulphanilyl-5-nitrobenzoate, converting the nitro group to an amino group by reduction, and hydrolyzing the acetylamino group to an amino group.

GEORGE W. ANDERSON.